United States Patent
Dunbar

[15] 3,674,166
[45] July 4, 1972

[54] MATERIAL TRANSPORTING APPARATUS

[72] Inventor: Glenn G. Dunbar, Toledo, Ohio

[73] Assignee: Allied Tube & Conduit Corporation, Harvey, Ill.

[22] Filed: June 29, 1970

[21] Appl. No.: 50,423

[52] U.S. Cl..............................214/501, 214/505, 298/17.5
[51] Int. Cl.........................................................B60p 1/04
[58] Field of Search................214/501, 505, 77 R; 298/17.5, 298/22 R

[56] References Cited

UNITED STATES PATENTS 3,522,894   8/1970   Tornheim..............................214/501

*Primary Examiner*—Albert J. Makay
*Attorney*—McDougall, Hersh & Scott

[57] ABSTRACT

This application discloses a wheeled cart comprising a frame on which is mounted a motor connected by transmission means to wheels at one end of the cart to propel it. A frame extension is pivotally mounted at one end of the frame and has a bed pivotally mounted thereon at its end opposite from its pivotal connection to the frame. A piston and cylinder actuator is pivotally mounted between the bed and the frame to cause the frame extension to pivot toward a supporting surface and when it has reached the limit of its movement to cause the bed to move toward a vertical position.

5 Claims, 4 Drawing Figures

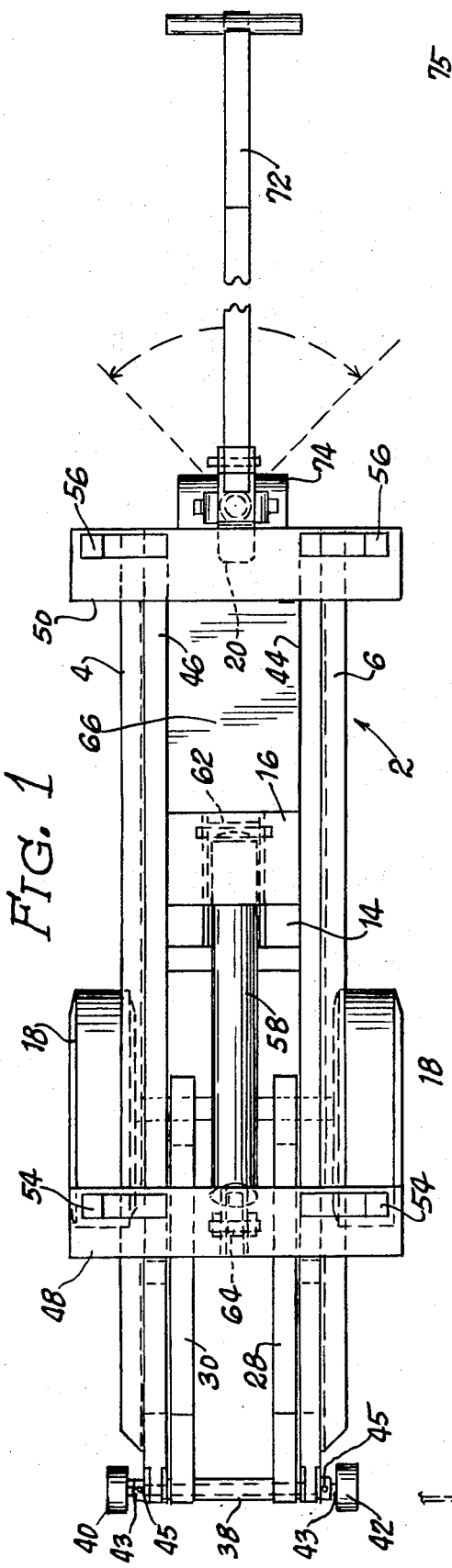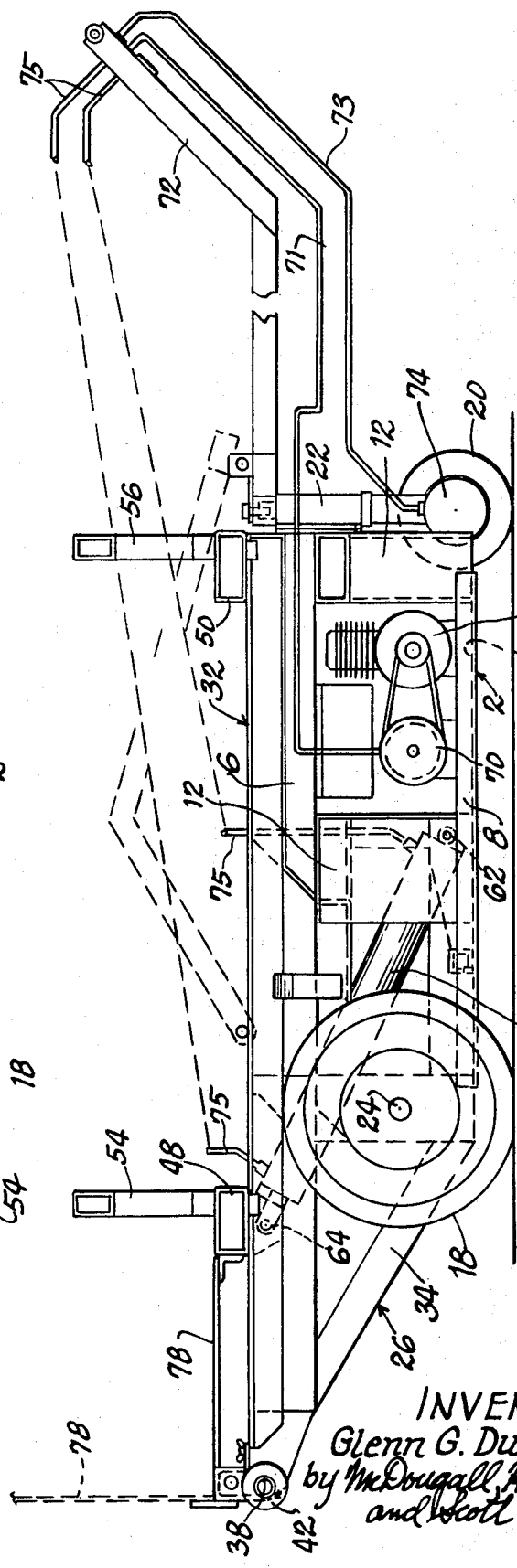

MATERIAL TRANSPORTING APPARATUS

BACKGROUND OF THE INVENTION

This invention relates generally to material handling apparatus. More specifically, it relates to apparatus for transporting and vertically positioning various material.

The unloading and transporting from a truck, railway car or the like of various materials or articles such as tubes, conduit sheets, containers or the like frequently require that the material be stacked or positioned vertically in a warehouse or other receiving area. More often than not the material is disposed to lie in a horizontal plane while being transported by a truck. This is particularly true of pipe tubing or conduit. Yet, there is more economical use of warehouse floor space when such material is positioned vertically while awaiting use. While it is possible to unload tubing or the like from a truck and transport it to a storage area and there position it vertically using manual labor or portable cranes or similar devices, the amount of labor and time is significant. In addition, there is the risk of injury to the workers performing these operations.

Therefore, it is an object of this invention to provide a novel apparatus for transporting material to a storage area and positioning it vertically.

It is another object of this invention to provide a novel apparatus for transporting material to a storage area and positioning it vertically which reduces the time and labor required for such an operation.

It is still another object of this invention to provide a novel apparatus for transporting material to a storage area and positioning it vertically which is reliable and is relatively safe for the operator.

A still further object of this invention is to provide a novel apparatus for transporting material which has been stored in a vertical position, and it is desired to support it horizontally while it is being transported.

SUMMARY OF THE INVENTION

The foregoing and other objects of the invention are achieved by providing a wheeled cart having a pivoted normally horizontal load carrying a bed which supports the material while it is being transported and when rotated can move to a substantially vertical position so to permit the vertical positioning of the material.

BRIEF DESCRIPTION OF THE FIGURES

The invention itself is set forth in the claims while an understanding of the structure and operation of an embodiment thereof may be obtained by reference to the detailed description taken in conjunction with the accompanying drawings in which:

FIG. 1 is a top view of an embodiment of the invention;
FIG. 2 is a side view of the embodiment of FIG. 1.

DETAILED DESCRIPTION

Figure 3:
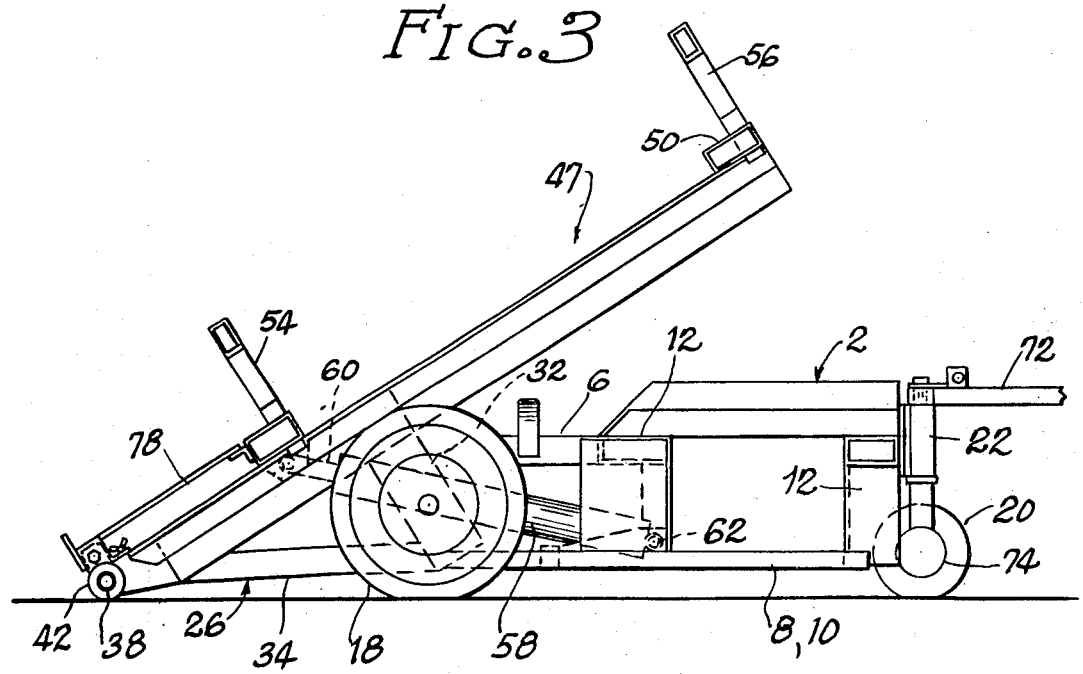
FIG. 3 is a side view similar to FIG. 1 showing the invention with a portion in a partially elevated position.

As shown in FIGS. 1 and 2, apparatus in accordance with the invention comprises a frame 2. The frame is formed from suitable structural shapes as a substantially rectangular boxlike member having a pair of upper spaced longitudinal members 4 and 6 forming an upper surface and a pair of lower spaced longitudinal members, one of which, 8, is shown forming a lower surface. Vertical members 12 extend between the lower members and the upper members to provide space for a motor and actuating means as described hereinafter. The frame is completed by lower transverse members such as 14 and 16 which span the lower members 8 and 10 and upper members 4 and 6, respectively.

A pair of front wheels 18 are rotatably mounted on the vertical members at the front of the frame while a rear wheel 20 is rotatably mounted in a vertically extending pivot 22 at the rear of the frame in order that the apparatus may be moved across a supporting surface such as the ground.

Mounted adjacent the lower end of the front of the frame on a pivot mounting 24 is a frame extension 26. The pivot 24 also functions as an axle for the wheels 18. The frame extension is constituted by a pair of spaced structural members 28 and 30 formed to have a right angle triangular configuration in cross section. The frame extension is pivoted to the frame so that when it is in its normal position for transporting material a base 32 is parallel to the vertical members 12 while another side extends horizontally and the bottom sides 34 extend at an angle upwardly and forwardly from the bottom of the frame. A shaft 38 connects the spaced frame members 28 and 30 at their forward end and carries rollers 40 and 42 on the outer sides of the members 28 and 30. The shaft 38 may be formed as a hollow cylinder and the rollers 40 and 42 mounted on telescoping shafts 43 within the shaft 38. Setscrews 45 may be provided to permit positioning of the rollers at fixed lateral positions to provide for stability on supporting surfaces of varying contour.

Mounted between the members 28 and 30 and the rollers 40 and 42 are a pair of longitudinal structural members 44 and 46 forming a part of a load carrying bed 47. The bed is completed by transverse load bearing elements 48 and 50 which span the side elements 44 and 46. If desired, vertically extending supports 54 and 56 may be provided on the transverse members 48 and 50 to prevent a load placed on the bed from falling off.

An actuating means which may take the form of a cylinder 58 supplied with fluid to actuate a piston movable therein which in turn causes a piston rod 60 to move outwardly from the cylinder is connected between the frame and the bed. In the particular embodiment illustrated, the cylinder is pivotally mounted at 62 on the transverse member 14 while the piston rod is pivotally mounted at 64 on the transverse member 48.

A support 66 spans the lower members 8 and 10 at the rear of the cart and carries a motor means 68 which may take the form of an internal combustion engine driving a pump 70 in a hydraulic power transmission system. A suitable conduit 71 extends from the pump to control valves which may be operated from a handle 72 extending from the vertical pivot 22. Additional conduits 75 supply the fluid controlled by the valves to the cylinder 58 to cause the piston rod 60 to extend and retract under the direction of an operator. Additional fluid lines 73 extend from the control valves to a hydraulic motor 74 mounted in the wheel 20 to propel the carriage across a supporting surface.

Referring now to FIG. 2 of the drawing, there may be seen an illustration of the apparatus in accordance with the invention when the bed is in its normal or substantially horizontal position. After a suitable load has been placed thereon and transported to the location where it is desired to position the load in the vertical position, the cart is stopped and fluid supplied to the bottom of the cylinder 58. This causes the piston and the piston rod 60 to move outwardly from the cylinder. Initially, the effect is to exert a force on the bed 47 causing it to rotate slightly about its pivot 38. Some portion of that force is transmitted to the pivot 38 at which point it includes a vertical component which is effective to rotate the frame extension 26 downwardly about its pivot 24.

The relative disposition of the parts at this point is illustrated in the schematic drawing in FIG. 3 wherein the frame extension 26 has rotated downwardly about its pivot while the bed has rotated upwardly about its pivot. This action continues until the frame extension can rotate no further by virtue of the engagement of rollers 40 and 42 with the supporting surface. At this point the bed may be rotated further or the apparatus advanced so as to bring it closer to a wall against which the load is to be positioned.

Figure 4:
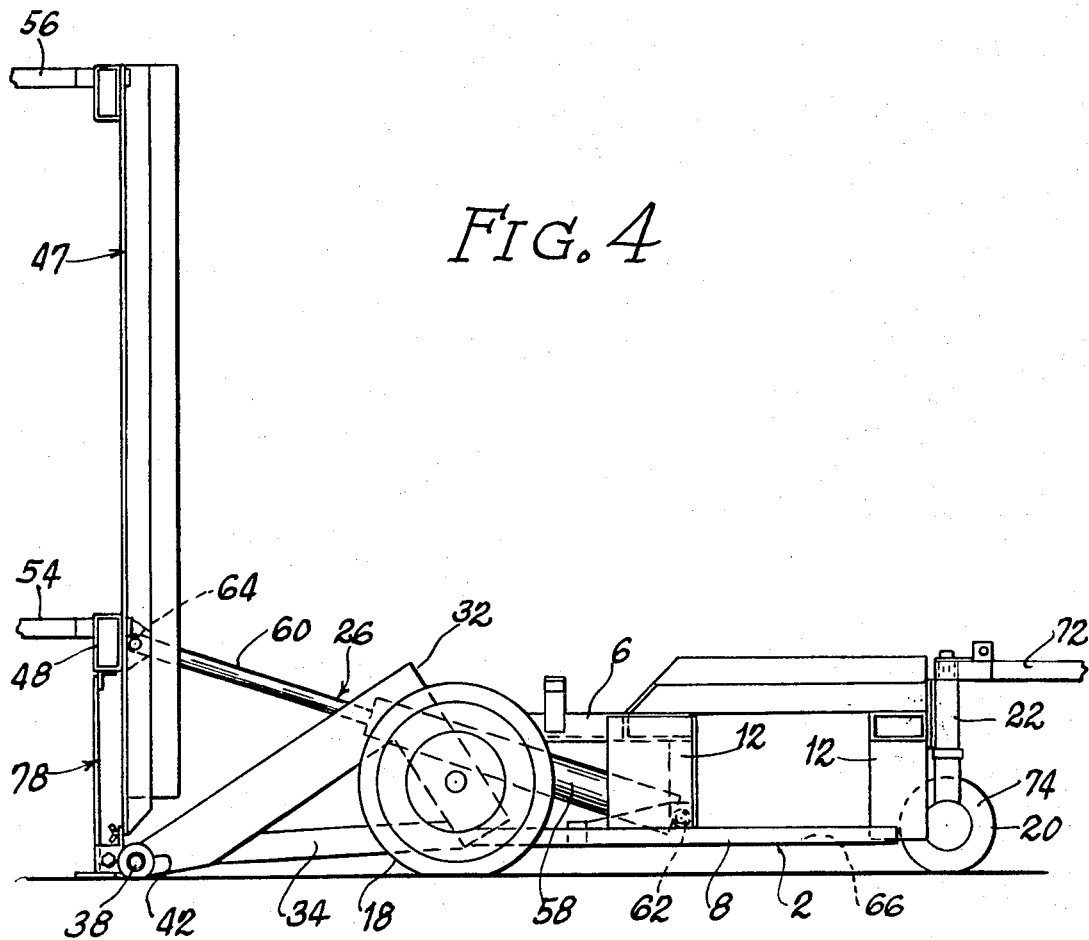
FIG. 4 is a side view similar to FIG. 3 showing the portion in a completely elevated position.

When the apparatus has been positioned a desired distance from such a wall, the cylinder is supplied with additional fluid so as to cause the piston rod to extend outwardly further. The further extension of the piston rod causes continued rotation of the bed until it reaches a substantially vertical position. This is illustrated in FIG. 4. At this point the apparatus may be withdrawn from the load which is now resting on the supporting surface against the wall. If desired, a rotatable base 78 may be provided on the pivot 38. The purpose of such a base is to provide support for particular materials such as bundles of tubing or the like which may be transported and pushed by the apparatus.

Obviously, changes may be made in various specific details of construction without department from the spirit of the invention, and it is intended by the claims appended hereto to cover all variations and modifications which fall within their scope.

What is claimed as new and desired to be secured by Letters Patent of the United States is:

1. Apparatus for transporting and vertically positioning material comprising: a frame; wheels mounted at each end of said frame; a frame extension pivotally mounted at one end of said frame adjacent the bottom thereof and extending forward of said wheels at said one end; a material carrying bed pivotally mounted at the forward end of said frame extension so as to be movable from a substantially horizontal to a substantially vertical position; said bed extending rearwardly from its pivotal mounting over said frame extension and said frame when in its substantially horizontal position; and actuating means having a single telescopic extensible element connected to a portion of said bed forward of said frame extension whereby when said element is first extended said frame extension will pivot toward a supporting surface and move said bed from the horizontal toward the vertical and when said element is further extended after said frame extension is pivoted to the limit of its movement said bed will rotate about its pivot on said frame extension to a substantially vertical position.

2. The apparatus of claim 1 wherein said frame comprises a rectangular frame having an upper surface and a bottom surface spaced therefrom; and said frame extension is in the form of a right angle triangle in longitudinal cross section and is pivoted on said frame.

3. The apparatus of claim 2 wherein said actuating means comprises a cylinder having a piston and a piston rod extendable therefrom; means pivotally mounting said cylinder and said piston rod between a portion of said bed forward of the pivot point of said frame extension and adjacent the bottom surface of said frame.

4. The apparatus of claim 2 including motor means mounted in said frame between the top and bottom surfaces thereof and transmission means connected between said motor means and a wheel at one end of said frame.

5. The apparatus of claim 4 wherein said actuating means comprises a cylinder having a piston and a piston rod extendable therefrom; means pivotally mounting said cylinder and said piston rod between a portion of said bed forward of the pivot point of said frame extension and adjacent the bottom surface of said frame; and a fluid pump connected to said motor means so as to be driven thereby and connected to said cylinder to cause actuation of said piston and piston rod.

* * * * *